L. ANDERFUHREN.
PNEUMATIC TIRE SIGNAL.
APPLICATION FILED JULY 26, 1919.

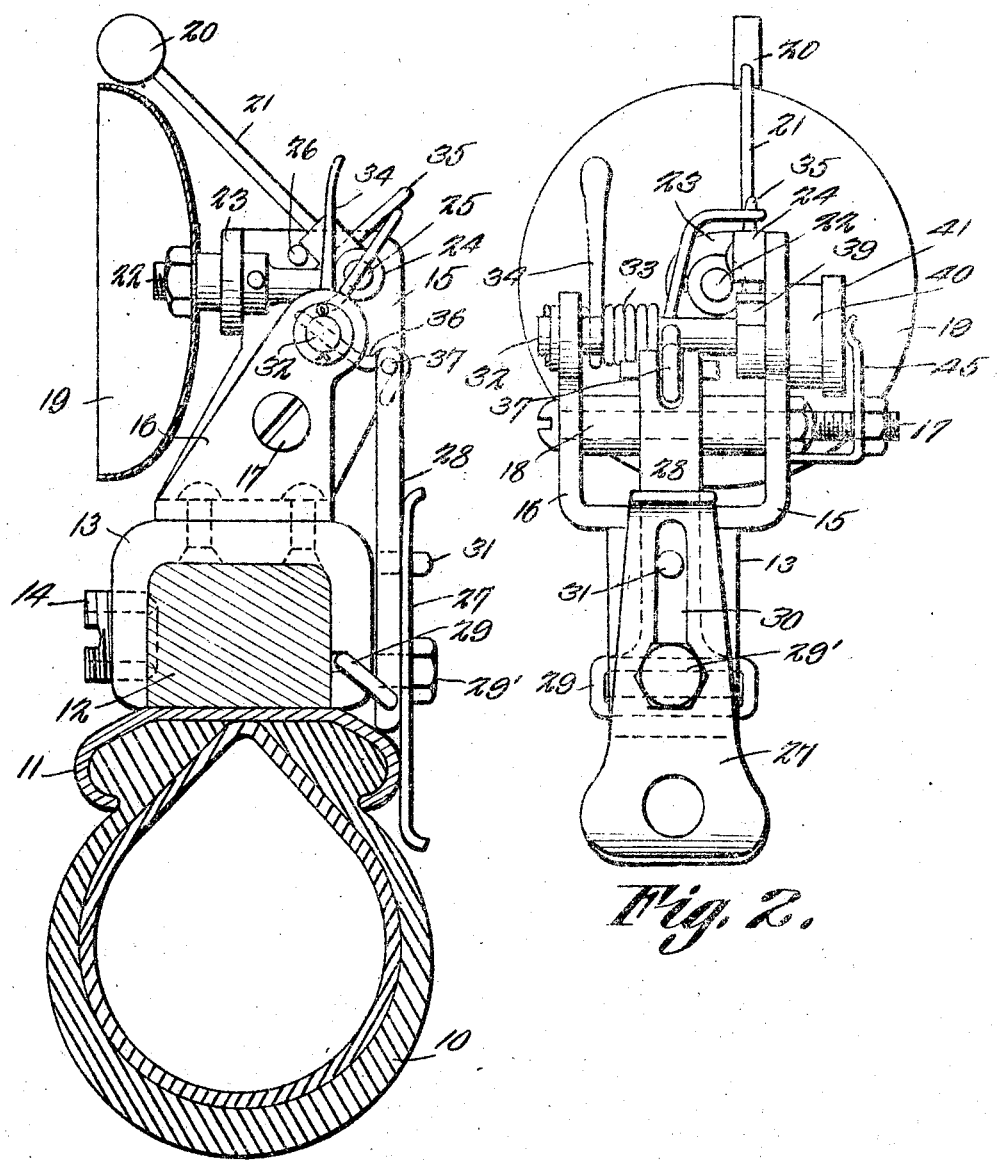

1,323,807.

Patented Dec. 2, 1919.
2 SHEETS—SHEET 2.

INVENTOR.
Louis Anderfuhren,
BY
Henry G. Brewington.
ATTORNEY.

UNITED STATES PATENT OFFICE.

LOUIS ANDERFUHREN, OF BALTIMORE, MARYLAND.

PNEUMATIC-TIRE SIGNAL.

1,323,807.　　　　　Specification of Letters Patent.　　Patented Dec. 2, 1919.

Application filed July 26, 1919. Serial No. 313,583.

*To all whom it may concern:*

Be it known that I, LOUIS ANDERFUHREN, a citizen of the United States, residing at Baltimore, State of Maryland, have invented certain new and useful Improvements in Pneumatic-Tire Signals, of which the following is a specification.

This invention relates to devices applicable to pneumatic vehicle tires, and designed to automatically give notice to the driver when the tire has become deflated from a puncture or other cause.

The invention has for its object to provide a novel and improved audible signal device which is sounded when deflation of the tire occurs, and also to provide a device of this kind which is comparatively simple in construction, and which can be readily attached to the wheel equipped with the tire.

The object stated is attained by means of a combination and arrangement of parts to be hereinafter described and claimed, and in order that the same may be better understood, reference is had to the accompanying drawing forming a part of this specification.

In the drawing,

Figure 1 is a view in transverse section of an automobile tire and rim with the signal attached thereto.

Fig. 2 is an elevation of the device.

Figure 3:
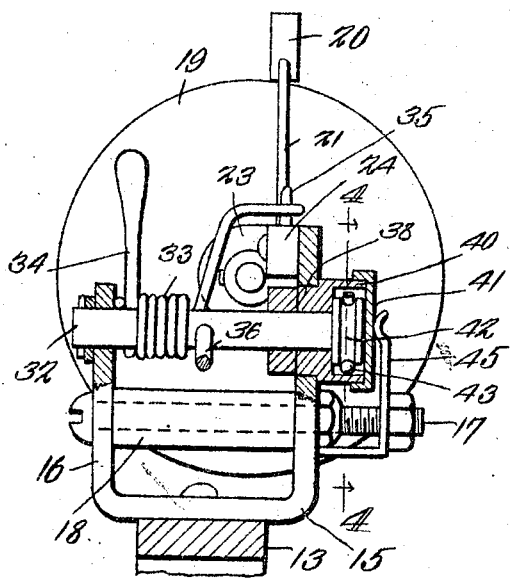
Fig. 3 is a fragmentary longitudinal section.
Figure 4:
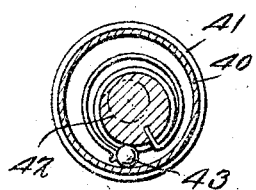
Fig. 4 is a section on line 4—4 of Fig. 3.
Figure 5:
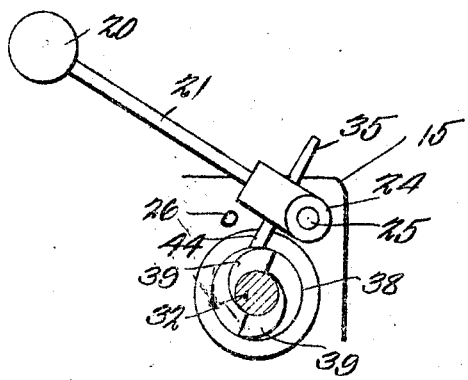
Fig. 5 is a detail sectional view of the clapper operating cam.

Referring specifically to the drawing, 10 denotes a pneumatic tire which is carried by the usual rim 11 mounted on the felly 12 of the wheel. The construction of these parts is immaterial to the present invention, and a detailed description thereof is therefore not necessary. The invention is applicable to any standard motor vehicle wheel equipped with a pneumatic tire, and no change in the structure of the wheel or the tire is necessary.

The supporting member of the signal device is a U-shaped clamp 13 which is fitted over the felly 12 to seat against the sides and the inner surface thereof, and fastened to the felly by a screw 14. To this clamp is riveted or otherwise secured a bracket member having two laterally spaced and parallel arms 15 and 16, respectively, carrying a transverse bolt 17 which projects from the arm 15, and is fitted between the latter and the arm 16 with a spacing sleeve 18.

The bracket arm 15 carries a bell 19 or other audible signal device which is sounded by a clapper 20 having a resilient stem 21. The bell is supported by a screw bolt or other suitable means 22 secured to an ear 23 on the bracket arm 15. The inner end of the stem 21 is carried by a hub 24 which is pivoted on a pin 25 extending from the bracket arm 15, and the latter also has an outstanding stop pin 26 which is in the path of the hub. The stop pin is so positioned that it is struck by the hub 24 when the latter swings to carry the clapper 20 toward the bell 19, and before the clapper touches the bell, and as the stem 21 is resilient, the latter is flexed and the clapper strikes the bell to sound the same. The following mechanism is provided for sounding the bell.

Alongside the felly 12 and the rim 11 is mounted a controlling bar 27 which is positioned radially with respect to the wheel and has its outer end normally positioned close to one side of the tire 10 near the rim. The bar 27 is adjustably connected to a member 28 in the form of a bar which is loosely connected near its inner end to one side of the clamp 13, by a link 29. The bar 27 is made fast to the bar 28 by a screw 29', the former being slotted, as shown at 30 to seat the screw and also a guide pin 31 extending from the bar 28. By providing the slot 30, the bar 27 can be adjusted radially with respect to the wheel, and thus properly positioned with respect to different sized tires. The outer end of the bar 27 where it is to engage the tire 10, is rounded off to prevent damage to the tire. The bars 27 and 28 are the controlling members of certain elements to be presently described, by which the bell 19 is sounded.

The bracket arms 15 and 16 support a rock shaft 32 around which is coiled a spring as shown at 33. One end of this spring is anchored to an arm 34 extending from the shaft 32, and the other spring end is bent out to press against an arm 35 extending from the hub 24 and force the latter against the stop 26. The shaft 32 also carries an outstanding arm 36 which is pivotally connected to the inner end of the bar 28, as shown at 37. It will therefore be seen that the shaft 32 is rocked when the bars 27 and 28 are forced radially inward with respect to the wheel.

In the bracket arm 15 is an aperture in which is rotatably mounted the hub 38 of one of the members of a clutch. One end of this hub has two diametrically opposite cams or wipers 39, and the other end has a housing 40 closed at its outer end by a cap 41. The shaft 32 passes loosely through the hub 38 and extends into the housing 40, and in the latter it is formed with a peripherally grooved disk 42. This disk is located eccentrically with respect to the axis of the shaft, and between its periphery and the wall of the housing is located a ball 43. It will therefore be seen that the motion of the shaft 32, in one direction, is transmitted to the hub 38 and its cams 39 by the wedging action of the ball 43 between the disk 42 and the wall of the housing 40. The shaft is of course free to turn in the opposite direction without turning the hub 38.

The hub 24 of the clapper stems 21 has a laterally extending arm 44 which is positioned to engage the cams 39. This arm normally seats on the highest point of one of the cams, and in this position it holds the clapper stem retracted, with the hub 24 thereof spaced from the stop 26. The spring 33 is also now tensioned and pressing against the arm 35 in a direction to advance the clapper stem. If now the shaft 32 is turned sufficiently to swing the cam 39 clear of the arm 44, the clapper stem is released and the bell is sounded. The shaft continues to turn until the next cam reaches the arm 44 and retracts the clapper stem, whereupon the parts are ready for another actuation.

The shaft 32 is actuated by the bars 27 and 28 when the tire 10 becomes deflated to such an extent that the bar 27 comes in contact therewith. At every revolution of the wheel, when the bar is pointing down to the ground and the tire is being flattened out, said bar, with the bar 28, is forced inwardly to rock the shaft 32, with the result hereinbefore described.

The housing cap 41 is held seated by a spring pressed arm 45 carried by the end of the bolt 17 projecting from the bracket arm 15.

Figure 6:
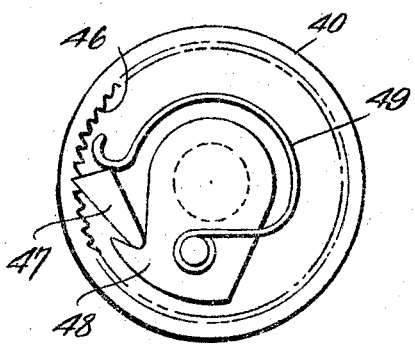
Fig. 6 is a modified form of clutch used in conjunction with the device.

Fig. 6 shows a slightly modified form of clutch associated with the shaft 32, a ratchet clutch being provided. The ratchet teeth 46 are on the housing 40 and they are engageable by a pawl 47 which is carried by an arm 48 on the shaft 32 and is held against the ratchet teeth by a spring 49.

The frequency of the sounds emitted by the bell depend on the speed of the car and the extent to which the tire is deflated. A slightly deflated tire, with the car running at a moderate speed will cause the bell to sound every few seconds. A much deflated tire, under the same conditions, will cause the bell to sound at more frequent intervals, and the bell will sound no matter how slow the wheel turns. The device is not liable to injury by dirt and road conditions, and it can be readily cleaned. Only one screw is required to attach the device to the wheel and it is so located on the wheel that it does not interfere with the removal or mounting of the tire.

I claim:

1. A tire alarm device, comprising a supporting member having means for attachment to a wheel, a bell, a clapper for the bell having a pivoted stem, a cam for holding the clapper stem retracted, a spring for advancing the clapper stem, a rotatable member carrying the cam, a rock shaft, a clutch for coupling the shaft to the rotatable member, an actuating member for the shaft, and means for supporting the actuating member alongside a tire and radially with respect to the wheel.

2. A tire alarm device, comprising a supporting member having means for attachment to a wheel, a bell, a clapper for the bell having a pivoted stem, a cam for holding the clapper stem retracted, a spring for advancing the clapper stem, a rotatable member carrying the cam, a rock shaft, a clutch for coupling the shaft to the rotatable member, an arm extending from the shaft, and an actuator for the shaft connected to the arm and extending alongside the tire and radially with respect to the wheel.

3. A tire alarm device, comprising a supporting member having means for attachment to a wheel, a bell, a clapper for the bell having a pivoted stem, a cam for holding the clapper stem retracted, a spring for advancing the clapper stem, a rotatable member carrying the cam, a rock shaft, a clutch for coupling the shaft to the rotatable member, an arm extending from the shaft, and an actuator for the shaft linked to the aforesaid supporting member and connected to the arm, said actuator extending alongside the tire and radially with respect to the wheel.

4. A tire alarm device, comprising a supporting member having means for attachment to a wheel, a bell, a clapper for the bell having a pivoted stem, a cam for holding the clapper stem retracted, a spring for advancing the clapper stem, a rotatable member carrying the cam, a rock shaft, a clutch for coupling the shaft to the rotatable member, an arm extending from the shaft, and an actuator for the shaft linked to the aforesaid supporting member and connected to the arm, said actuator extending alongside the tire and radially with respect to the wheel, and having a longitudinally adjustable extension at its outer end engageable by the tire when the latter is deflated.

In testimony whereof I affix my signature in the presence of two witnesses.

LOUIS ANDERFUHREN.

Witnesses:
E. WALTON BREWINGTON,
HOWARD D. ADAMS.